(12) United States Patent
Tokura et al.

(10) Patent No.: US 6,660,684 B2
(45) Date of Patent: Dec. 9, 2003

(54) PROCESS FOR PRODUCING ORGANIC HALOGEN COMPOUND-DECOMPOSING CATALYSTS, AND A PROCESS FOR PRODUCING ORGANIC HALOGEN COMPOUND-DECOMPOSING FILTERS

(75) Inventors: Katsuhiro Tokura, Nagoya (JP); Kazuyuki Oshita, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 48 days.

(21) Appl. No.: 10/017,206

(22) Filed: Dec. 14, 2001

(65) Prior Publication Data

US 2002/0103075 A1 Aug. 1, 2002

Related U.S. Application Data

(63) Continuation-in-part of application No. PCT/JP01/03172, filed on Apr. 12, 2001.

(51) Int. Cl.[7] ............ B01J 21/06; B01J 23/42; B01J 23/44
(52) U.S. Cl. ........... 502/339; 502/350; 502/150
(58) Field of Search ............... 502/339, 350, 502/150

(56) References Cited

U.S. PATENT DOCUMENTS

| | | | | |
|---|---|---|---|---|
| 4,888,317 A | * | 12/1989 | DeAngelis et al. | 502/60 |
| 5,162,283 A | * | 11/1992 | Moini | 502/236 |
| 5,234,883 A | * | 8/1993 | Schaefer-Sindlinger et al. | 502/339 |
| 5,407,887 A | * | 4/1995 | Miyashita et al. | 502/258 |
| 5,541,147 A | * | 7/1996 | Friedlander et al. | 502/100 |
| 5,821,186 A | * | 10/1998 | Collins | 502/8 |
| 6,162,759 A | * | 12/2000 | Oki et al. | 502/350 |
| 2002/0177524 A1 | * | 11/2002 | Hiraoka et al. | 502/185 |

FOREIGN PATENT DOCUMENTS

| | | |
|---|---|---|
| JP | 2-35914 A | 2/1990 |
| JP | 5-261284 A | 10/1993 |
| JP | 10-114521 A | 5/1998 |
| JP | 11-116243 A | 4/1999 |
| JP | 11-118746 A | 4/1999 |
| JP | 11-347407 A | 12/1999 |
| WO | WO 01/87478 | * 11/2001 |

* cited by examiner

*Primary Examiner*—M. Alexandra Elve
*Assistant Examiner*—Christina Ildebrando
(74) *Attorney, Agent, or Firm*—Burr & Brown

(57) ABSTRACT

An organic halogen compound-decomposing catalyst is provided, which affords excellent decomposing percentages even at low temperatures, and reduces the possibility of re-synthesizing dioxins and brominated dioxins. An organic halogen compound-decomposing catalyst is obtained by reacting a Pt salt and/or a Pd salt, an alkoxide derivative of Ti compound and an amino acid as an organic binder in a solvent, thereby synthesizing an organic metal precursor containing Pt and/or Pd and Ti in molecules thereof, and heating the organic metal precursor. This catalyst may be carried on a surface of a clean side of a ceramic filter. Since active points can be increased by uniformly dispersing the Pt and/or Pd particles in Ti particles, the catalyst has higher activity as compared with conventional catalysts, and exhibits excellent decomposing effects even at temperatures lower than 200° C.

6 Claims, 2 Drawing Sheets

|  | CO decomposing percentage | O-CT decomposing percentage | O-BT decomposing percentage |
|---|---|---|---|
| Pt conventional process | 96.97 | 52.58 | 40.52 |
| Pt precursor process | 96.75 | 74.13 | 70.1 |
| Pd conventional process | 95.51 | 50.12 | 37.11 |
| Pd precursor process | 93.15 | 72.11 | 65.7 |

Data at SV8000, 200°C composition : Pt, Pb 1g/honeycomb (L)
TiO₂ 100g/honeycomb (L)

PROCESS FOR PRODUCING ORGANIC HALOGEN COMPOUND-DECOMPOSING CATALYSTS, AND A PROCESS FOR PRODUCING ORGANIC HALOGEN COMPOUND-DECOMPOSING FILTERS

This is a continuation-in-part of International Application PCT/JP01/03172 with an international filing date of Apr. 12, 2001, published in Japanese on Nov. 1, 2001 under PCT Article 21(2).

TECHNICAL FIELD

The present invention relates to a process for producing organic halogen compound-decomposing catalysts to be used in treating waste gases mainly from incinerators, and a process for producing organic halogen compound-decomposing filters.

BACKGROUND ART

There have been improvements in burning conditions and advancements in waste gas treatment to reduce organic halogen compounds generated from city garbage incinerators. In general, high temperatures of at least 1000° C. are required to be maintained to completely oxidize and decompose halogenated organic substances such as organic halogen compounds in burning processes, but burning temperatures are usually set at 800 to 900° C. to prevent damage to furnace walls. It is not easy to completely oxidize and decompose the organic halogen compounds represented by organic chlorine compounds merely through improving burning conditions.

In a stoker furnace, where low-temperature areas or an incomplete burning area tend to be locally formed, a re-burning section needs to be provided to completely oxidize and decompose the organic halogen compounds. However, this poses problems in that the total amount of waste gases increases, and running with re-burning fuel causes costs to rise.

It is known that among the organic halogen compounds, dioxins and brominated dioxins are produced not only in the burning process, but also such are synthesized again from non-pyrolysed and unburnt residual portions and benzene ring-possessing precursor materials over a wide temperature zone of around 300 to 500° C. Therefore, even when attempts are made to reduce the dioxins and the brominated dioxins in the burning process, these are synthesized again in a succeeding stage. Consequently, the dioxins and the brominated dioxins in the waste gases are sometimes not reduced.

For the above reasons, the organic halogen compounds in the waste gases, including the dioxins and the brominated dioxins, need to be removed through waste gas treatment so that they may be kept stably at low concentrations.

Adsorption methods include adsorption with activated carbon and decomposition with a catalyst for the removal of the organic halogen compounds in the waste gases, including the dioxins and the brominated dioxins through the waste gas treatment. Although this adsorption method is the mainstream in the existing treatment of the organic halogen compounds, it is costly, and poses a problem in that activated carbon, once having adsorbed the dioxins, becomes a secondary waste, which requires a post treatment thereof. On the other hand, although the catalytically decomposing method has merit in that no secondary waste is produced, it has problems in that the dioxins are synthesized again through secondary reactions with the catalyst and the catalyst is degraded.

Although denitriding catalysts of a $V_2O_5$-$TiO_2$ system and a $V_2O_5$-$WO_3TiO_2$ system have been formerly used as organic chloride compound-decomposing catalysts, it has been confirmed that dioxins are produced, contrary to expectations, particularly if the concentration of the dioxins at the inlet for the catalyst is low. In recent years, in many areas where the concentration of dioxins in the waste gas is suppressed to not more than 1/10 of the governmental standard value set by residential agreements or the like, it was clarified that using such conventional organic halogen compound-decomposing catalysts might afford adverse effects in view of the above considerations. Thus, the re-synthesis of the dioxins with the catalyst becomes a problem. Further, since such a conventional catalyst needs to be used at high temperatures of 200 to 500° C., the problem that the waste gases need to be heated again comes out.

Moreover, investigations and research have recently been more actively made on the level of influence upon human health caused by dioxins and brominated dioxins produced during the burning processes of the wastes and the treating processes of the waste gases, as well as on processes through which they are produced.

Having thus examined the re-synthesis phenomena of dioxins and brominated dioxins with the catalysts, the inventors confirmed that $V_2O_5$ causes the above, and that if Pt and/or Pd is used, catalysts which decompose organic halogen compounds including the dioxins and the brominated dioxins can be obtained, free from the re-synthesis problem. A method which is ordinarily considered to produce titanium in which Pt and/or Pd is dispersed is a method of coating a powder of titanium oxide with an aqueous solution of a Pt salt and/or a Pd salt or impregnating a sintered body thereof with this solution, heating the resultant, decomposing the salt(s) and thereby precipitating Pt and/or Pd thereon.

In the organic halogen compound-decomposing catalyst obtained by this method, however, the Pt and/or Pd particles have large diameters, and precipitate on the surface of titanium oxide uniformly. Thus, there is a problem that a catalytic effect is not effectively exhibited if the particle diameters of titanium oxide are small. In addition, the titniumoxide particles are sintered, and titanium oxide and noble metal particles are simultaneously grain-grown (sintered), if the particles are heated at high temperatures. It causes degradation in the catalytic activity. Summary of the Invention The present invention has been accomplished to provide a process for producing an organic halogen compound-decomposing catalyst which can solve the above-mentioned problems of the prior art, increase active points by uniformly dispersing Pt and/or Pd fine particles in titanium particles, and assuredly oxidize and decompose the organic halogen compounds including the dioxins and the brominated dioxins, without fear of re-synthesizing dioxins and brominated dioxins, even if the catalytic reaction temperature is lowered to 200° C. or less.

It is another object of the present invention to provide a process for producing an organic halogen compound-decomposing filter by using the above organic halogen compound-decomposing catalyst.

The process for producing the organic halogen compound-decomposing catalyst according to the present invention, which process has been made to solve the above problems, comprises the steps of synthesizing an organic metal precursor containing Pt and/or Pd and Ti in molecules thereof by reacting a Pt salt and/or a Pd salt, an organic Ti compound and an organic binder in a solvent, heating the organic metal precursor, and thereby obtaining the organic halogen compound-decomposing catalyst in which fine particles of Pt and/or Pd are dispersed in $TiO_2$.

The process for producing an organic halogen compound-decomposing filter according to the present invention, comprises the steps of synthesizing an organic metal precursor containing Pt and/or Pd and Ti in molecules thereof by reacting a Pt salt and/or a Pd salt, an organic Ti compound, and an organic binder in a solvent, coating the organic metal precursor on a surface of a clean side of a ceramic filter or coating the precursor on wall surfaces of inner pores of the filter by impregnation, heating the resulting filter, and thereby carrying on the ceramic filter the organic halogen compound-decomposing catalyst in which fine particles of Pt and/or Pd are dispersed in $TiO_2$.

In the organic halogen compound-decomposing catalyst obtained by the process of the present invention, the Pt and/or Pd fine particles are dispersed in the $TiO_2$ by heating the organic metal precursor containing Pt and/or Pd and Ti in its molecules. Therefore, as compared with conventional catalysts obtained by coating or impregnation, the catalyst of the present invention has largely increased active points, and can be highly activated. Thus, the amount of expensive Pt or Pd can be reduced to cut the cost. The organic metal precursor is ordinarily heated at a heating temperature of 450to 500° C. in an air atmosphere under atmospheric pressure. The heating time is set at such a sufficient length in connection with the heating temperature, etc. that the organic binder is completely burnt out and that Pt or Pd is uniformly dispersed in $TiO_2$. Further, since the organic halogen compound can be decomposed even under a low temperature condition of less than 200° C., the waste gases need not be heated again, and the organic halogen compound is not synthesized again. In the present invention, "Pt or Pd" means "Pt and/or Pd."

In the organic halogen compound-decomposing filter obtained by the process of the present invention, the organic halogen compound-decomposing catalyst having such functions is carried on the surface of the clean side of the ceramic filter or on the inner filtering wall surfaces of the filter. Thus, the filter has a merit that dust is removed with simultaneous decomposition of the organic halogen compounds.

DETAILED DESCRIPTION OF THE INVENTION

Figure 1:
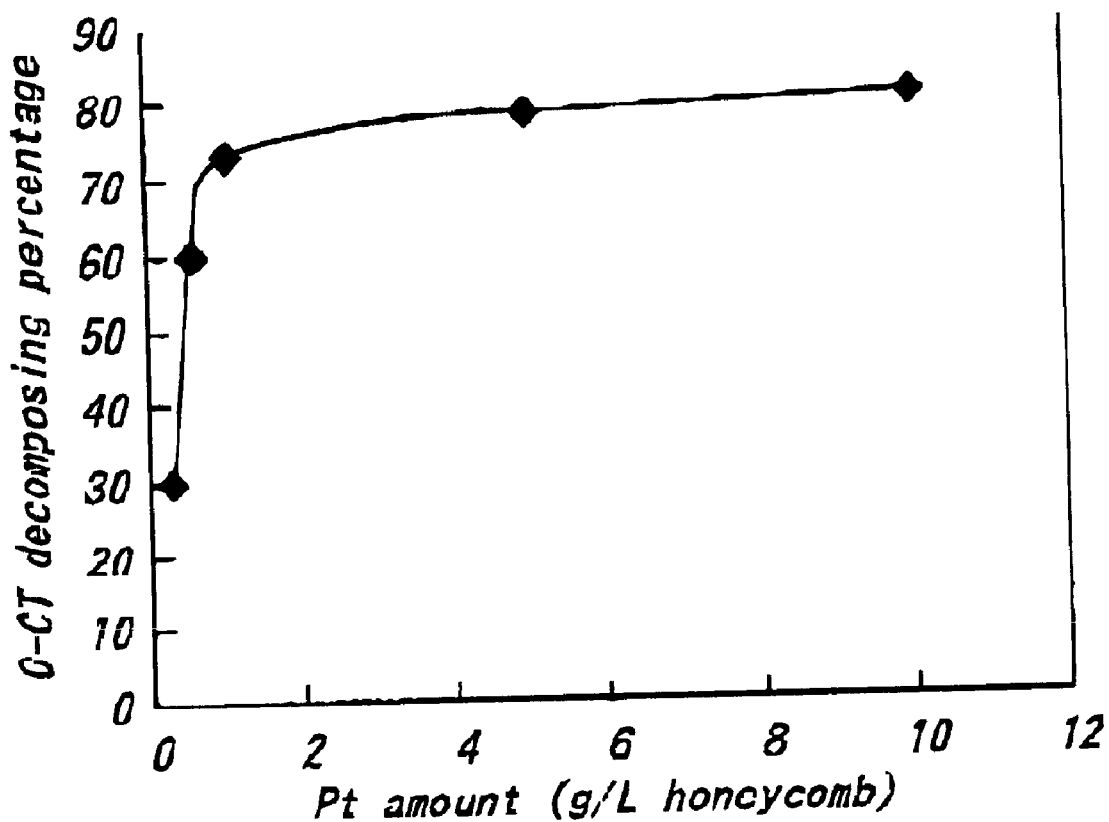
FIG. 1 is a graph showing the experimental results of Example 3.

In the following, preferred embodiments of each of the inventions will be shown.

First, an organic compound of Ti, and a soluble salt of Pt and/or Pd are dissolved in a solvent containing an organic binder. As the Ti organic compound, an alkoxide derivative (for example, a derivative in which a part of the Ti alkoxide is replaced by acetyl acetonate group(s) or a derivative in which a part of the Ti alkoxide is replaced by triethanol aminate group(s)) may be used. As the soluble Pt salt, chloroplatinic acid, chloroplatinic acid hexahydrate, platinum dichloride, platinum tetrachloride or the like may be used. As the soluble Pd salt, palladium chloride, palladium nitrate or the like may be used.

As the organic binder for Ti and the noble metal(s), an amino acid such as L-lysin, L-glycine or L-prolin may be used. Particularly, L-prolin is preferred, because it has a high solubility for methanol to be used as the solvent. Ti ions are bonded to Pt and/or Pd ions by the organic binder, which fixes the ions in the molecules. As the organic Ti compound, the Ti alkoxide derivative is preferably used.

The "organic binder" is a material which fixes the Ti ions and the Pt and/or Pd ions in the molecules of the organic binder through bonding the above ions with the binder, is removed by heating and thus produces bound fine particles of $TiO_2$ and Pt and/or Pt. The material does not give adverse influences such as catalytic poise upon the physical properties of the organic halogen compound-decomposing catalyst.

A preferred mixing ratio of the above components is that the Pt and/or Pd salt is 0.5 to 5 wt. parts, methanol is 100to 200wt. parts, and amino acid is 0.1 to 1.5 wt. parts relative to 100wt. parts of the organic Ti compound (for example, the Ti alkoxide derivative). When these components are reacted at 70° C. to 80° C., an organic metal precursor in which the components are uniformly dispersed as considered at a molecular level. The phrase "organic metal precursor" means that the Ti ions and the Pt and/or Pd ions are connected to each other in one molecule via chemical bonds. Different from the case where such ions are dissolved in a solvent, relative positional relationship among these ions is fixed. In this state, Ti is bound with Pt and/or Pd via the amino acid. When the precursor is heated to 450to 500° C., however, the amino acid as the organic binder is burnt out, the organic metal precursor is thus decomposed, the Pt and/or Pd is converted to super fine particles and highly dispersed in $TiO_2$ produced through oxidation of Ti, and the organic halogen compound-decomposing catalyst in which Pt and/or Pd is around 1 to 10 wt. parts relative to 100wt. parts of $TiO_2$ can be obtained.

Since the active points of the organic halogen compound-decomposing catalyst are increased by converting the Pt and/or Pd to the super fine particles, the catalytic activity is improved. Due to this, the amount of Pt and/or Pd used can be reduced, and a lower cost can be realized, as compared with the prior art. Furthermore, since the catalyst performs to decompose the organic halogen compounds even at low temperatures of less than 200° C., it has many merits, e.g., that the waste gases need to be heated again. As described in examples mentioned later, the decomposing efficiency of the dioxins with this catalyst is much higher than a catalyst obtained by a method in which a titanium oxide powder is coated with an aqueous solution of a Pt salt and/or a Pd salt, and Pt and/or Pt is precipitated by heating and decomposing.

According to one embodiment of the present invention, the above organic metal precursor is not heated as it is, but the precursor is converted to a catalyst-coating solution by mixing it with a $TiO_2$ sol functional as a glue, and is coated on the surface of a clean side of a porous ceramic filter, followed by heating. As a result, the organic halogen compound-decomposing catalyst in which Pt and/or Pd is converted to super fine particles and highly dispersed in $TiO_2$ can be carried on the clean side of the ceramic filter. Alternatively, the inner pore wall surfaces of the ceramic filter can be coated by immersing the filter into the above catalyst-coating solution and heating the resultant filter.

When the ceramic filter is used for the treatment of the waste gases, dust can be filtered off with the ceramic filter, and the organic halogen compounds in the waste gases can be simultaneously decomposed with the organic halogen compound-decomposing catalyst. Further, since the organic halogen compound-decomposing catalyst is carried on the clean side of the filter or on the inner pore wall surfaces of the filter, the catalyst can be prevented from being degraded with the dust contained in the waste gases. Furthermore, while the organic halogen compounds in the waste gases are decomposed when they pass the filter walls containing the catalyst, the flow rate of the waste gases increases when they pass the pores in the filter walls. Thus, the decomposition is promoted due to the dispersing effect as compared with common catalysts in the form of a honeycomb and pellets having no filtering function.

Besides, the organic halogen compound-decomposing catalyst can be carried on an activated carbon adsorbent by coating the adsorbent with the catalyst-coating solution of the organic metal precursor or impregnating the solution into the adsorbent. The use temperature limit of the activated carbon adsorbent is 130 to 150° C., but the organic halogen compound-decomposing catalyst according to the present invention can exhibit a sufficient dioxin-decomposing effect even in such a low temperature range. Therefore, when this activated carbon adsorbent is used for the treatment of the waste gases, it can adsorb the organic halogen compounds and the catalyst can oxidize and decompose the compounds, so that not only the organic halogen compounds can be decomposed, but also heavy metals, $SO_2$, HCl, etc. can be removed through adsorption.

EXAMPLES

Example 1

In order to confirm the effects of the present invention mentioned above, orthochlorotoluene, which was considered as a substituting material for the dioxins in catalytic engineering, was used, and its oxidation decomposing percentage was measured.

In the experiment, an organic halogen compound-decomposing catalyst which was produced by mixing 1 wt. part of Pt with 100wt. parts of an alkoxide derivative of Ti, dissolving the mixture into methanol containing an amino acid, impregnating the surface of a ceramic honeycomb filter with the resulting precursor solution at a rate of Pt being 1 g/l volume liter honeycomb, and heating the honeycomb filter. For comparison purposes, a ceramic honeycomb filter was prepared by being impregnated with a conventional dioxin-decomposing catalyst, followed by heating. The catalyst had been prepared by coating a powder of titanium oxide having a specific surface area of 70 $m^2/g$ with Pt, and the impregnation rate was identically 1 g Pt/1 volume liter honeycomb.

These two kinds of honeycombs were set in equipment where a waste gas containing orthochlorotoluene and CO flowed under conditions of SV of 8000 $h^{-1}$ and a temperature of 190° C., and their decomposing percentages were measured. As a result, CO could be decomposed at around 98% in each of the catalysts produced from the precursor solution according to the present invention and the catalyst obtained in the Comparative Example, so that no conspicuous difference was seen with respect to the CO oxidation decomposing percentage. However, the orthochlorotoluene oxidation decomposing percentage as the substituting material for the dioxins was over 75% in the catalyst according to the present invention, but only about 50% for the catalyst of the Comparative Example. This confirmed the superiority of the present invention in a low temperature range of less than 200° C.

Example 2

The above Example 1 was an example conducted in view of organic chlorine compounds including dioxins. On the other hand, in this Example 2, orthobromotoluene was used, in view of the organic bromo compounds, including the brominated dioxins, as the other organic halogen compounds, and its oxidation decomposing percentage was measured.

In the experiment, an organic halogen compound-decomposing catalyst which was produced by mixing 1 wt. part of Pt with 100wt. parts of an alkoxide derivative of Ti, dissolving the mixture into methanol containing an amino acid, impregnating the surface of a ceramic honeycomb filter with the resulting precursor solution at a rate of Pt being 1 g/l volume liter honeycomb, and heating the honeycomb filter. For comparison purposes, a ceramic honeycomb filter was prepared through being impregnated with a conventional dioxin-decomposing catalyst, followed by heating. The catalyst had been prepared by coating a powder of titanium oxide having a specific surface area of 70 $m^2/g$ with Pt, and the impregnation rate was identically 1 g Pt/1 volume liter honeycomb.

These two kinds of honeycombs were set in equipment where a waste gas containing orthobromotoluene and CO flowed under conditions of SV of $8000h^{-1}$ and a temperature of 190° C., and their decomposing percentages were measured. As a result, CO could be decomposed at around 98% in each of the catalyst produced from the precursor solution according to the present invention and the catalyst obtained in Comparative Example, so that no conspicuous difference was seen with respect to the CO oxidation decomposing percentage. However, the orthobromotoluene oxidation decomposing percentage as the substituting material for the dioxins was over 70% in the catalyst according to the present invention, but only about 40% in the catalyst of Comparative Example. This confirmed the superiority of the present invention in a low temperature range of less than 200° C.

Example 3

An experiment was effected in the same manner as in Example 1 except that the carrying amount of Pt was changed, and the temperature of the honeycomb catalyst portion was 190° C. That is, Pt was mixed at 0.25, 0.5, 1,5 or 10 g/l liter honeycomb, and $TiO_2$ mixed at 100g/l liter honeycomb. Results are shown in FIG. 1. From FIG. 1, almost no changes were seen with respect to the orthochlorotoluene-removing percentage in a range of 1 to 10 g/l liter honeycomb. However, since the noble metal is expensive, not more than 1 g/l liter honeycomb is preferable from the view of the cost.

Example 4

Figure 2:
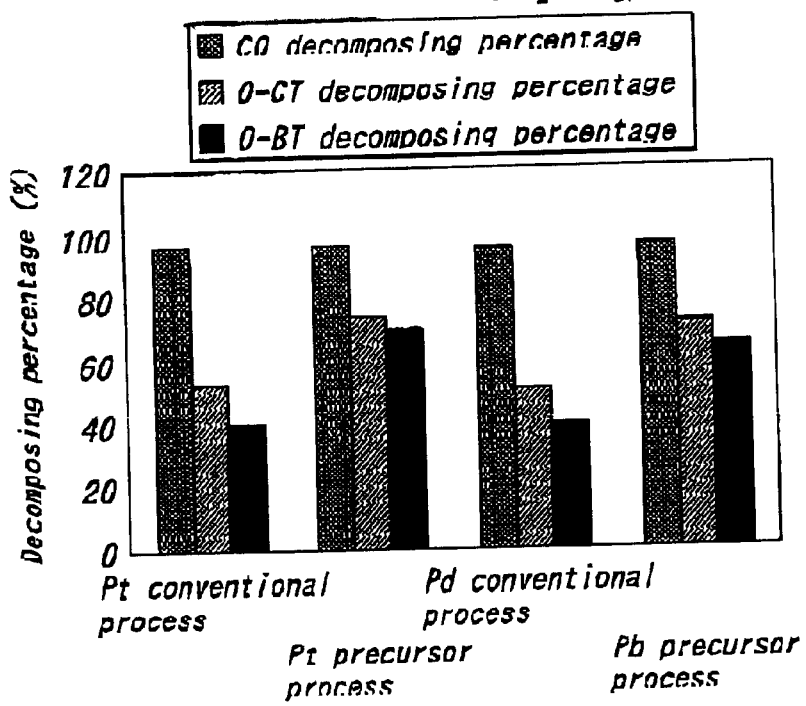
FIG. 2 is a graph showing the experimental results of Example 4.

With respect to the experimental method in Example 1, under the conditions of $SV8000h^{-1}$, 200° C. and Pt/Pd and $TiO_2$ being mixed at 1 g/l liter honeycomb and 100 g/l liter honeycomb, respectively, the CO-decomposing percentage and an orthochlorotoluene-decomposing percentage (O-CT decomposing percentage) and the orthobromotoluene-decomposing percentage (O-BT decomposing percentage) when the orthobromotoluene was used instead of orthochlorotoluene were measured according to the process of Example 1 and the conventional method in which a conventional dioxin-decomposing catalyst having titanium oxide powder having a specific surface area of 70 $m^2/g$ coated with Pt was similarly impregnated at 1 g Pt, Pd/l volume liter honeycomb, followed by heating. The results are shown in FIG. 2. It was confirmed that as compared with the conventional process, the invention process exhibited far more excellent CO-decomposing percentage, O-CT decomposing percentage and O-BT decomposing percentage, and that Pd gave similar test results as in the case of Pt.

Effects of the Invention

As explained above, according to one embodiment of the present invention, the organic halogen compound-decomposing catalyst of which active points are increased by uniformly dispersing the fine particles of Pt and/or Pd in titania particles by utilizing the organic metal precursor can be obtained. Since this catalyst can assuredly oxidize and decompose organic halogen compounds even if the catalyst reaction temperature is lowered to 200° C. or less, the waste gases do not need to be re-heated, unlike conventional methods. In addition, different from the conventional $V_2O_5$-$TiO_2$ based and $V_2O_5$-$WO_3$-$TiO_2$ based catalysts, there is no fear of re-synthesizing the dioxins, even if the concentration of the catalyst at the inlet is low. According to another embodiment of the present invention, a ceramic filter can be obtained, which can simultaneously remove dust and decompose organic halogen compounds by carrying the organic halogen compound-decomposing catalyst in which the Pt and/or Pd fine particles are dispersed in Ti on the ceramic filter.

What is claimed is:

1. A process for producing an organic halogen compound-decomposing filter, comprising the steps of:

synthesizing an organic metal precursor containing Pt and/or Pd and Ti in molecules thereof by reacting a Pt salt and/or a Pd salt, an organic Ti compound, and an organic binder in a solvent;

heating said organic metal precursor;

coating said organic metal precursor on a surface of a ceramic filter; and heating said filter to form an organic halogen compound-decomposing catalyst on said filter, said catalyst containing fine particles of Pt and/or Pd dispersed in $TiO_2$.

2. The organic halogen compound-decomposing catalyst producing, process of claim 1, wherein said organic binder comprises an amino acid.

3. The organic halogen compound-decomposing catalyst producing process of claim 1, wherein said organic Ti compound comprises an alkoxide derivative of Ti.

4. A process for producing an organic halogen compound-decomposing filter, comprising the steps of:

synthesizing an organic metal precursor containing Pt and/or Pd and Ti in molecules thereof by reacting a Pt salt and/or a Pd salt, an organic Ti compound, and an organic binder in a solvent;

heating said organic metal precursor;

coating said organic metal precursor on wall surfaces of inner pores of a ceramic filter by impregnation; and heating said filter to form an organic halogen compound-decomposing catalyst on said filter, said catalyst containing fine particles of Pt and/or Pd dispersed in $TiO_2$.

5. The organic halogen compound-decomposing catalyst producing process of claim 4, wherein said organic binder comprises an amino acid.

6. The organic halogen compound-decomposing catalyst producing process of claim 4, wherein said organic Ti compound comprises an alkoxide derivative of Ti.

* * * * *